Patented Sept. 13, 1932

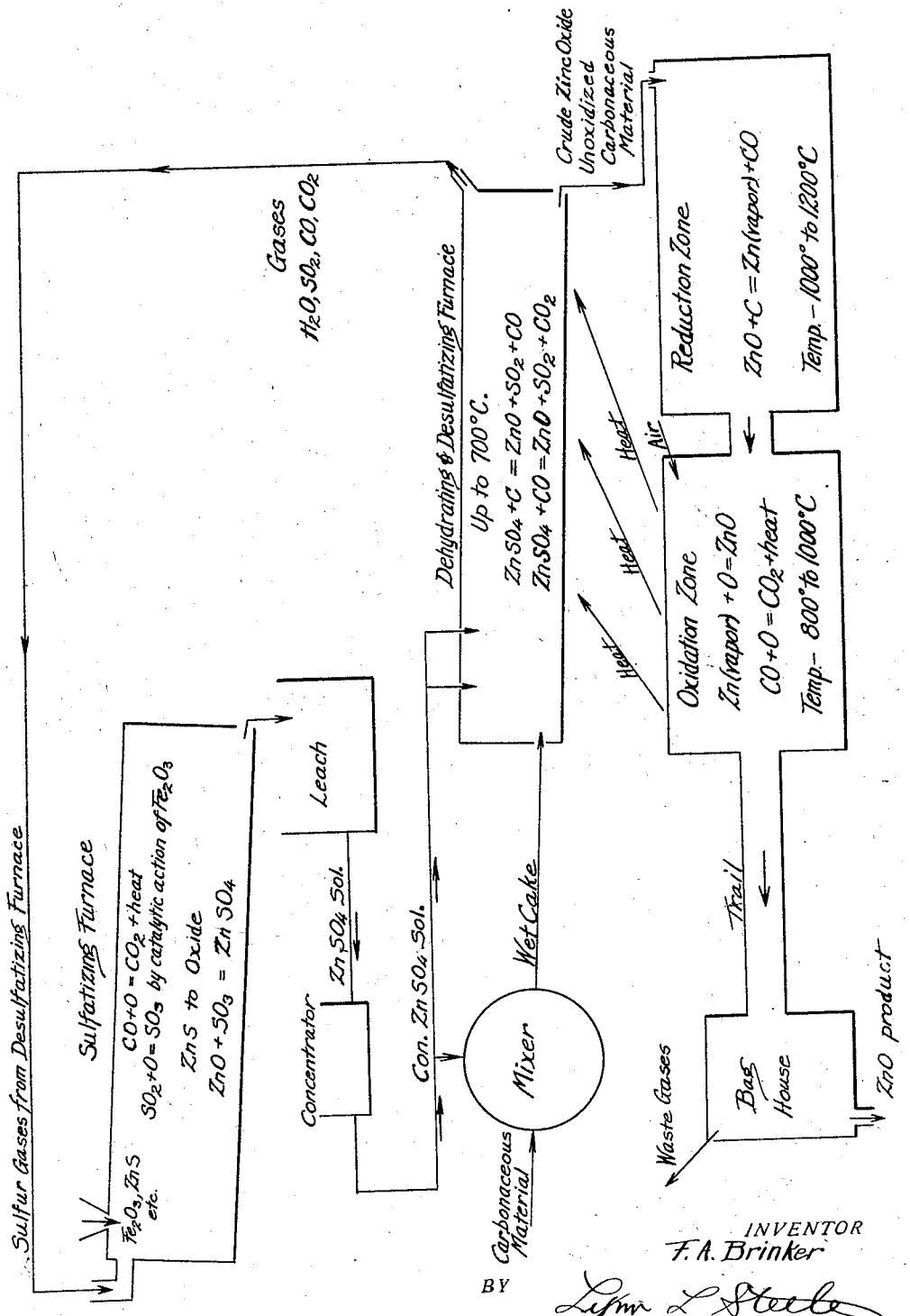

1,877,122

UNITED STATES PATENT OFFICE

FREDERIC A. BRINKER, OF DENVER, COLORADO

PROCESS FOR PRODUCING CRUDE AND FUMED ZINC OXIDE

Application filed April 20, 1927. Serial No. 185,190.

The object of this invention is to provide a process wherein zinc sulfate solution may be employed as the source of zinc in the production of a crude zinc oxide of a fumed zinc oxide, or both.

In the operation of the process the crude zinc oxide is formed in either case, this crude oxide being converted when the fumed product is desired. Briefly stated, the process comprises mixing at least a part of the zinc sulfate solution with an absorbent material, preferably carbonaceous such as saw-dust, or coal, to which may be added oxidized zinc ores and the like, whereby a wet cake is formed. Said cake is then introduced into a drying and desulfatizing zone into which the remainder of the solution, if any, may be sprayed, air being excluded as far as possible to avoid complete consumption of the carbon. Here the sulfate is converted into a crude zinc oxide containing appreciable or large amounts of carbon. When a pure fumed product is desired, the crude product containing carbon is passed, preferably without cooling, into a two-zone reverberatory furnace, Wetherill grate furnace or the like, the first zone of which constitutes a reduction zone, the carbon introduced with the crude oxide being for the most part the reducing agent; the reduced vapor is then passed to the second zone of said furnace which is an oxidation zone into which air is introduced whereby the zinc vapor is oxidized and a fumed product formed which is passed to the bag house. Heat from this zone may be employed to heat the dehydrating and desulfatizing zone, while gases and vapors from the latter may be passed to a sulfatizing furnace in which the sulfate is produced, said gases being relied upon to furnish fuel (CO) and sulfur gases required in the sulfatizing roast.

This process has been designed to accomplish in the most advantageous manner the three major steps, namely, 1. Dehydrating the zinc sulfate solution,
2. Desulfatizing the zinc sulfate to form crude ZnO containing carbon,
3. Reduction and subsequent oxidation of the zinc of the crude oxide to form a pure fumed product.

In these steps large amounts of carbonaceous material are required both as fuel to provide heat and for reducing purposes, and invention resides also in carrying on and combining the various steps so as to 1. Minimize the fuel for reduction,
2. Minimize the fuel for heat,
3. Eliminate water and sulfur efficiently, both from economical and metallurgical standpoints, and
4. Produce a pure fumed oxide from the crude zinc oxide formed in the dehydrating and desulfatizing step.

The invention resides not only in the various features above pointed out but also in such other novel features, steps and combinations thereof as may be elsewhere herein disclosed.

IN DETAIL

The various steps of the invention and the general types of apparatus required are indicated diagrammatically in the accompanying drawing wherein the primary reactions also are set forth.

Apparatus and materials

The apparatus indicated consists of a mixer of almost any design for commingling the liquids and solids, a furnace for dehydrating and desulfatizing the wet cake, a reverberatory type of furnace (or the like) having two chambers in the first of which the crude oxide from the desulfatizing furnace is reduced to zinc vapor and in the second of which the zinc vapor is oxidized, and a trail and bag house in which the fumed product is collected. This equipment may be hooked up with a sulfatizing furnace to which the gases from the desulfatizing zone are passed, and with the device for leaching out the zinc sulfate from the sulfatizing furnace, the sulfate solution (preferably after having been passed through a concentrating evaporator) being conducted to the mixer and to the dehydrating zone. This solution should be as concentrated as possible, and the concentrator may be heated by waste heat from the oxidation zone of the reverberatory furnace.

In the mixer all or only a portion of the sulfate solution is added to a carbonaceous solid which performs the manifold function of a carrier or absorbent for the solution, a mechanical agent for increasing the evaporative surface, and a source of carbon for reduction both in the desulfatizing zone and in the reduction to zinc vapor. The amount of such material added at this point may be sufficient for all the carbon needs of the process, and preferably will be; however a smaller quantity may be employed and an additional amount of carbon may be introduced into the reduction zone later. This carbonaceous material may be of many forms, such as coal, coke, saw-dust and the like. Also, roasted or oxidized zinc ores may be added with the carbonaceous materials, as may some zinc sulfide, all of these going through to fumed zinc oxide as a final product.

Dehydrating and desulfatizing

The wet cake or pulp formed in the mixer is passed in any manner into the drying end of the dehydrating and desulfatizing furnace. As the temperature of the cake is raised, the water is driven off in the form of steam, and, if any portion of the zinc sulfate solution is to be added in this furnace, it is sprayed upon or otherwise added to the drying cake after some of the water has been driven from said cake but before the temperature has increased materially. With increase of temperature the water is all driven off including that combined with the sulfate. Beginning at about 550° C., carbon and CO commence to react with the zinc sulfate yielding ZnO, $SO_2$, CO and small quantities of $CO_2$. At 600° C. to 700° C., the reaction is very rapid and complete. No air is required and only that which leaks in will be present, so that a considerable amount of unoxidized carbonaceous material will be present in the resulting crude zinc oxide. The necessary heat for this furnace can be supplied either entirely or in part by the waste heat from the oxidation zone of the reverberatory furnace, while the gases including the water vapor may be and preferably will be conducted to a sulfatizing furnace in order to supply the additional $SO_2$ necessary for the sulfatizing reaction, as well as to supply fuel for heat in the form of CO, as more fully set forth hereinafter.

The efficiency of the work done in the dehydrating and desulfatizing furnace is very high because 1. Dehydration takes place at a low temperature,
2. Desulfatization takes place at the lowest possible temperature (the temperature is gradually approached and when reached the reaction occurs), and
3. Waste heat from the oxidation zone of the reverberatory furnace can be utilized.

The chief reactions in this portion of the process are:

$$ZnSO_4 + C = ZnO + SO_2 + CO,$$
$$ZnSO_4 + CO = ZnO + SO_2 + CO_2.$$

Reduction and oxidation

The crude zinc oxide containing the unoxidized carbonaceous matter may be treated elsewhere subsequently, but according to the preferred practice it is passed from the desulfatizing furnace directly to the reduction zone of a reverberatory furnace, or a Wetherill grate furnace, or whatever type may be used for the purpose. Preferably also, this transfer is made without any cooling of the crude oxide whose temperature upon discharge is about 700° C.; thus maximum conservation of heat is obtained. If necessary, additional reducing agent is introduced, although ordinarily sufficient of this is originally introduced in the cake or pulp fed to the dehydration zone. In addition sufficient heat is applied to raise the temperature to the reduction point (1000° C. to 1200° C.) whereby metallic zinc vapor is formed according to the reaction $$ZnO + C = Zn \text{ (vapor)} + CO.$$

The zinc vapor and the gases pass through the throat to the oxidation zone wherein the zinc is oxidized at 800° C. to 1000° C. by the addition of air together with the oxidation of the carbon monoxide, thus:

$$Zn \text{ (vapor)} + O = ZnO,$$
$$CO + O = CO_2 + \text{heat}.$$

The pure fumed zinc oxide so formed is passed through the trail to the bag house and there collected. The waste heat developed by the oxidation preferably is utilized to heat the dehydrating and desulfatizing furnace and to concentrate the zinc sulfate solution before preparing the cake, as above indicated.

Waste gases for sulfatizing

The waste gases from the desulfatizing zone, as previously mentioned, may be used as a convenient source of additional sulfur for the efficient production of $ZnSO_4$ from zinc ores in a sulfatizing furnace wherein sulfur trioxide is formed from the sulfur dioxide by the catalytic effect of $Fe_2O_3$, and zinc sulfide is roasted to oxide which is then converted into sulfate by the action of the sulfur trioxide, according to the following reactions:

$$SO_2 + O = SO_3,$$
$$ZnS + 3O = ZnO + SO_2,$$
$$ZnO + SO_3 = ZnSO_4,$$

Also the carbon monoxide in said waste gases acts as a fuel for supplying the additional heat required in the sulfatizing furnace, thus:

$$CO + O = CO_2 + heat.$$

The zinc sulfate is then leached from the gangue, and upon being concentrated is ready for mixing into cake and passing to the dehydrating and desulfatizing furnace.

I claim:

1. A process for producing fumed zinc oxide comprising commingling zinc sulfate solution with a carbonaceous material containing carbon in excess of requirements for desulfatizing the sulfate, dehydrating the mixture, roasting to desulfatize the same and produce a crude zinc oxide containing carbonaceous matter, treating the crude oxide to reduce the same to zinc vapor whereby the contained carbonaceous matter promotes said reduction, and oxidizing said zinc vapor.

2. A process for producing fumed zinc oxide comprising commingling zinc sulfate solution with a carbonaceous absorbent to form a pulp, drying said pulp, roasting the same to yield a zinc oxide, said carbonaceous absorbent being present in sufficient quantity to form an excess of carbon which is carried over with said oxide, passing said oxide and contained carbon without cooling into a reducing zone wherein zinc vapor is formed, and oxidizing said vapor to form fumed oxide.

3. In the production of zinc oxide, a process comprising heat-treating zinc ores to form sulfates, leaching out the zinc sulfate so formed, mixing the resulting zinc solution with a carbonaceous material, dehydrating the mixture, desulfatizing the dehydrated mixture to yield zinc oxide and gases containing sulfur and combustible gas, and passing said gases into contact with said ores in the sulfating step to furnish heat and sulfur for the sulfating operation.

4. A process according to claim 1 wherein excess heat from the final oxidizing zone is employed to dehydrate and desulfatize said mixture.

5. In the production of zinc oxide a process comprising heat-treating zinc ores to form sulfates, leaching out the sulfates so formed, mixing the resulting zinc sulfate solution with a carbonaceous absorbent to form a pulp, drying the pulp, roasting the same to yield zinc oxide and gases containing sulfur, passing said gases into contact with said ores to furnish sulfur for the sulfating operation, said carbonaceous absorbent being present in sufficient quantity to form an excess of carbon which is carried over with the zinc oxide, passing said oxide and contained carbon into a reducing zone where zinc vapor is formed and oxidizing said vapor to form fumed oxide.

6. In the production of zinc oxide a process comprising heat treating zinc ores to form sulfates, leaching out the zinc sulfate so formed, mixing the resulting zinc solution with a carbonaceous material, dehydrating the mixture and desulfatizing the dehydrated mixture to yield zinc oxide.

7. A process according to claim 6 followed by reducing the oxide to form zinc vapor, and oxidizing the zinc vapor to form a fumed zinc oxide.

8. A process according to claim 6 followed by reducing the oxide to form zinc vapor, oxidizing the zinc vapor to form a fumed zinc oxide and employing the excess heat from the final oxidizing step to dehydrate and desulfatize the zinc sulfate solution.

In testimony whereof I affix my signature.

FREDERIC A. BRINKER.